United States Patent
Gale et al.

(10) Patent No.: US 6,420,793 B1
(45) Date of Patent: Jul. 16, 2002

(54) POWER DELIVERY CIRCUIT WITH BOOST FOR ENERGETIC STARTING IN A PULSED CHARGE STARTER/ALTERNATOR SYSTEM

(75) Inventors: Allan Roy Gale, Livonia; Michael W Degner, Farmington Hills, both of MI (US); Michael Alan Tamor, Toledo, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 29 days.

(21) Appl. No.: 09/666,582

(22) Filed: Sep. 21, 2000

(51) Int. Cl.[7] ................................................. F02N 11/04
(52) U.S. Cl. .................... 290/34; 310/113; 123/179.28; 320/123; 180/65.2
(58) Field of Search .......................... 290/31, 34, 38 R, 290/50; 310/112, 113; 123/179.28; 320/123; 180/65.2

(56) References Cited

U.S. PATENT DOCUMENTS

| | | | |
|---|---|---|---|
| 3,808,481 A | * | 4/1974 | Rippel .......................... 290/50 |
| 4,684,814 A | * | 8/1987 | Radomski ..................... 290/31 |
| 4,720,638 A | | 1/1988 | Vollbrecht |
| 4,916,345 A | | 4/1990 | Tong |
| 5,001,412 A | | 3/1991 | Carter et al. |
| 5,097,140 A | | 3/1992 | Crall |
| 5,146,095 A | | 9/1992 | Tsuchiya et al. |
| 5,155,374 A | | 10/1992 | Shirata et al. |
| 5,157,267 A | | 10/1992 | Shirata et al. |
| 5,285,862 A | | 2/1994 | Furutani et al. |
| 5,350,994 A | | 9/1994 | Kinoshita et al. |
| 5,469,820 A | | 11/1995 | Data et al. |
| 5,642,270 A | * | 6/1997 | Green et al. ................... 363/17 |
| 5,705,859 A | | 1/1998 | Karg et al. |
| 5,744,895 A | * | 4/1998 | Seguchi et al. .............. 310/112 |
| 5,925,938 A | | 7/1999 | Tamor |
| 5,998,976 A | | 12/1999 | Steffan |
| 6,049,185 A | | 4/2000 | Ikeda |
| 6,094,031 A | * | 7/2000 | Shimane et al. ............. 320/118 |
| 6,177,734 B1 | * | 1/2001 | Masberg et al. ............... 290/31 |
| 6,202,615 B1 | * | 3/2001 | Pels et al. ............... 123/179.21 |
| 6,202,776 B1 | * | 3/2001 | Masberg et al. ........... 180/65.2 |
| 6,209,672 B1 | * | 4/2001 | Severinsky ................. 180/65.2 |
| 6,274,943 B1 | * | 8/2001 | Hasegawa et al. ......... 290/38 R |

* cited by examiner

*Primary Examiner*—Joseph Waks

(57) ABSTRACT

A method of energizing a combined starter/alternator to start an engine in a vehicle including a primary energy storage device and a secondary energy storage device. The method includes the steps of monitoring a charge value on the secondary energy storage device, and activating a converter switching circuit to charge the secondary energy storage device with the primary energy storage device until the charge value is greater than a maximum charge value. Thereafter, an inverter switching circuit is activated to energize the starter/alternator with the power available in the primary and secondary energy storage devices. The starter/alternator is activated as a starter motor until the engine starts or the charge on the secondary energy storage device falls below a mininum charge value.

15 Claims, 2 Drawing Sheets

POWER DELIVERY CIRCUIT WITH BOOST FOR ENERGETIC STARTING IN A PULSED CHARGE STARTER/ALTERNATOR SYSTEM

CROSS REFERENCE TO RELATED APPLICATIONS

This application is related to copending U.S. patent application Ser. No. 09/667,196 entitled "Pulsed Charge Starter/Alternator Control System" filed Sep. 21, 2000 and U.S. patent application Ser. No. 09/667,187 entitled "Pulsed Charge Power Delivery Circuit" filed Sep. 21, 2000 both of which are incorporated herein by reference and commonly owned by the assignee of the present invention.

BACKGROUND

The present invention relates to electrical systems for motor vehicles and, more particularly, to a power delivery circuit for energetic starting of an engine in a vehicle having a pulsed charge starter/alternator system. Combined starter/alternators such as those known in the art are disclosed in U.S. Pat. Nos. 4,720,638; 4,916,345; 5,001,412; 5,097,140 and 5,469,820. A combined starter/alternator as used in a motor vehicle can be used as a motor to crank and start the engine as well as a generator to provide electrical power to the vehicle electrical systems. When operated as a starter motor, the starter/alternator is supplied with current from the battery and is operated to rotate the crankshaft of the engine. The engine crankshaft is rotated until the engine fires and continues to run on its own power. When used as a generator, the running engine is coupled to the starter/alternator which, in turn, produces a three-phase output that is rectified to a steady state DC output that is used to maintain the charge on the vehicle energy storage device to meet the vehicle electrical load requirements.

When operating as a generator, the efficiency of the starter/alternator is defined as the ratio of the input power to the output power. Such generators have both fixed and variable losses. Some of these losses are associated with the switching circuitry such as the inverter used to rectify the output of the generator. There are three primary classifications of losses: mechanical losses, electrical losses, and magnetic losses. Mechanical losses are primarily due to the rotation of the rotor and include bearing friction loss and windage loss. Magnetic losses include eddy current-current loss and hysteresis loss. All of these losses can be grouped into two categories, namely, fixed losses and variable losses. Fixed losses are losses that do not change with load when the machine is operating at a known speed. Therefore, rotational losses are one part of fixed losses. In the case of a wound field machine where the field current is required to set up the required flux in the machine, the power supplied to the field lining is also considered a fixed loss. On the other hand, variable losses are losses that vary with the load current. All of the copper or resistive losses are included in this category. Since the losses associated with the starter/alternator when operating as a generator are only partially load dependent, the system exhibits low efficiencies at low power levels. At higher output power levels, the output power rises relative to the losses and correspondingly, the system efficiency rises as well. This continues up to a peak efficiency torque point whereafter additional torque input into the generator does not result in a significant increase in power output and, hence, the efficiency falls off.

It has been found that operating a starter/alternator at a continuous power output approximately equal to the vehicle electrical load demand such as 500 W is a low efficiency output for a typical starter/alternator. Accordingly, there is a need for a starter/alternator control system having increased efficiency.

It is also desirable to provide a system that allows a higher amount of instantaneous power to the starter/alternator when operating as a starter motor.

SUMMARY OF THE INVENTION

It is therefore an object of the present invention to provide an improved power delivery circuit having increased starting power in a pulsed charge starter/alternator system.

According to the present invention, the foregoing and other objects are attained by a method of energizing a combined starter/alternator to start an engine in a vehicle including a primary energy storage device and a secondary energy storage device. The method includes the steps of monitoring a charge value on the secondary energy storage device, and activating a converter switching circuit to charge the secondary energy storage device with the primary energy storage device until the charge value is greater than a maximum charge value. Thereafter, an inverter switching circuit is activated to energize the starter/alternator with the power available in the primary and secondary energy storage devices. In another aspect of the invention, the starter/alternator is activated as a starter motor until the engine starts or the charge on the secondary energy storage device falls below a minimum charge value.

One advantage of the present invention is that it has improved efficiency as compared to conventional starter/alternator charging systems, and improved starting capacity as compared to conventional starter/alternator systems. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DESCRIPTION OF THE PREFERRED EMBODIMENT

Figure 1:
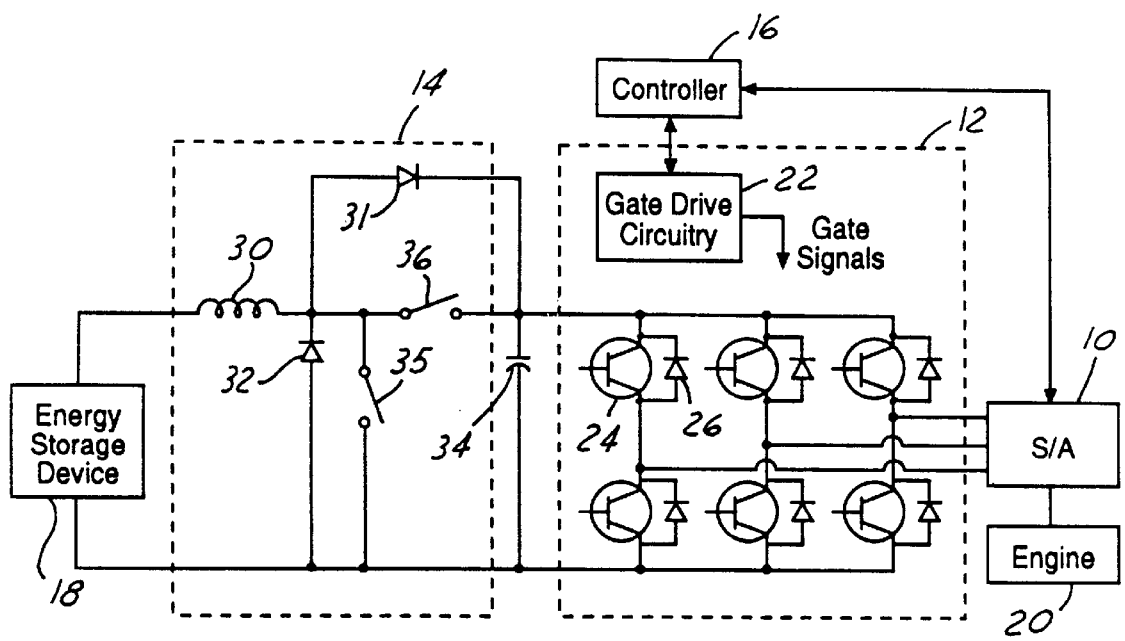
FIG. 1 is a schematic block diagram of one embodiment of a power delivery circuit with boost for engine starting in a pulsed charge starter/alternator system according to the present invention.

Referring now to FIG. 1, there is shown a schematic block diagram of a power delivery circuit with boost for engine starting in a pulsed charge starter/alternator system according to one embodiment of the present invention. The power delivery circuit includes a combined starter/alternator 10, and inverter 12, a converter 14, and a controller 16 which are used to maintain a charge on an energy storage device 18 such as a vehicle battery as well as provide power from the energy storage device 18 to the starter/alternator 10 to start the vehicle engine 20. The combined starter/alternator 10 is coupled to the vehicle engine 20 and can be any known combined starter/alternator.

When operating as a starter motor, as described in more detail below, the starter/alternator 10 receives charge from the primary energy storage device 18 and the secondary energy storage device 34 and functions to crank the engine 20 until the engine 20 is running. When operating as an alternator or a generator, the starter/alternator 10 is coupled to the running engine 20 and produces a three-phase output which is converted by inverter 12 to a steady-state DC output which is used to maintain the charge on the energy storage device 18. The primary energy storage device 18 may be a battery, a capacitor, or both. Energy storage device 18, in turn, is used to provide power to meet the vehicle electrical load demand of the vehicle subsystems such as the ignition system, lighting system, instrument panel and the convenience features.

The inverter 12 is operated by the controller 16 by way of gate drive circuitry 22 to provide steady-state DC output from the starter/alternator 10 when operating as a generator. The three-phase output of the starter/alternator 10 is electrically coupled to a plurality of switches 24 and a plurality of flyback diodes 26, each of which are connected in reverse polarity and in parallel with each of the power switches 24 and the inverter circuit 12. The switches 24 are preferably metal oxide silicon field effect transistors (MOSFETs) or integrated gate bipolar transistors (IGBTs) or any other conventional power switching device.

Controller 16 is preferably a digital signal processor (DSP). A controller 16 can be a dedicated controller to operate the converter 12 or alternatively, as shown in FIG. 1, it can provide multiple functions by controlling the converter 14 and/or the starter/alternator 10 as well. The controller 16 may also be part of the engine controller (not shown). In such cases, the controller 16 would include a central processing unit such as a microprocessor, inputs and outputs, and associated memory such as random access memory and read-only memory.

The converter 14 comprises an inductor 30, diode 31, diode 32, capacitor 34, switch 35, and switch 36. The converter 14 can be considered an up converter comprising inductor 30, diode 31, and switch 35 in cooperation with the capacitor 34 to deliver power to the starter/alternator when operating as a starting motor. The converter 14 also includes a down converter comprising inductor 30, diode 32, and switch 36 in cooperation with capacitor 34 for providing energy to the energy storage device 18 when the capacitor 34 is charged by the starter/alternator 10 when operating as a generator. In this capacity, it is preferable to operate the starter/alternator 10 at higher loads when operating as a generator to increase the efficiency of the starter/alternator 10. Accordingly, the inverter 12 intermittently periodically electrically couples the output of the starter/alternator 10 to the capacitor 34 to charge the capacitor 34. The capacitor 34, in turn, is used to charge the energy storage device 18 by way of the switch 36. The switches 35 and 36 are preferably MOSFETs or IGBTs which are activated at a high frequency to electrically couple the capacitor 34 and energy storage device 18.

Figure 2:
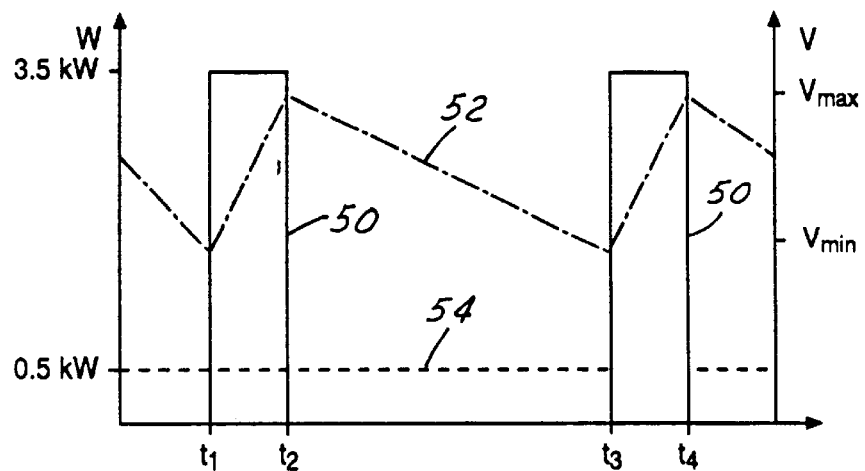
FIG. 2 is a graph of the operation of the power delivery circuit of FIG. 1.

Referring now to FIG. 2, there is shown a graph of the operation of the power delivery circuit of FIG. 1. When the starter/alternator 10 is operating as a generator, the inverter drive is enabled by the controller 16 to allow the starter/alternator 10 to charge the capacitor 34 to a maximum voltage, $V_{max}$. The inverter drive is then disabled by the controller 16 and the switch 36 of the converter 14 is activated to the let the converter comprising inductor 30, diode 32, and switch 36 to supply constant power to the energy storage device 18 until the capacitor 34 reaches a minimum voltage, $V_{min}$. At this point, the process is repeated. Alternatively, the converter circuit can be operated continuously rather than cycled. In the example shown on FIG. 2, the output of the starter/alternator when acting as a generator as shown as pulses 50, and a voltage across the capacitor 34 is shown as line 52.

In the example of FIG. 2, it is assumed that the energy storage device 18 is used to supply a constant 0.5 kW power to meet the vehicle electrical load demands. This electrical load demand is shown as line 54 in FIG. 2. The peak efficiency torque of the particular starter/alternator results in an output of 3.5 kW. Of course, this power output at the peak efficiency point will vary for the particular starter/alternator under consideration. The starter/alternator is then pulsed on from time $t_1$ to $t_2$ to charge the capacitors 34 from $V_{min}$ to $V_{max}$. At this point, the starter/alternator and/or the inverter drive circuit 12 is disabled and the capacitor 34 is allowed to decay from the $V_{max}$ to $V_{min}$ as power is drained from the capacitor by the energy storage device 18. At time $t_3$, when the capacitor voltage reaches $V_{min}$, the starter/alternator 10 is again electrically coupled to the capacitor 34 at a high efficiency operating point until the capacitor 34 reaches its desired charge value of $V_{max}$. The pulse is then terminated at $t_4$.

If the starter/alternator 10 were merely operated to output a continuous 0.5 kW to maintain the charge on the capacitor 34 and corresponding energy storage device 18 to meet the vehicle electrical load demand of 0.5 kW, the overall system efficiency would be lower. For the particular starter/alternator under consideration, it was observed that a continuous 0.5 kW system output power resulted in a starter/alternator efficiency of approximately 55%. The same system operated in the pulsed power mode, as shown in FIG. 2, however, had a system efficiency of approximately 84%. Thus, the pulsed power method of charging the capacitor resulted in a 52% improvement in the overall system efficiency.

In the example shown in FIG. 2, the assumed operating range of the capacitor 34 is between the rated voltage $V_{max}$ and one-half the rated operating voltage $V_{min}$. For such a design, the energy stored in the capacitor for use in supplying the energy to the storage device 18 is then $(3/8)CV^2$. Assuming a 400 volt energy storage device 18, a 0.5 kW load and 3 kW pulsed charge rate, the capacitor 34 would need to be a 0.5 Farads to provide a 10 second charge time ($t_1$ to $t_2$) at 3 kW and a 60 second discharge time ($t_2$ to $t_3$) at 0.5 kW. Of course, the discharge time will decrease, i.e., the rate of discharge will increase, as the load power requirements increase or if the capacitor 34 were made smaller. In this example, the 10 second charge time ($t_1$ to $t_2$) was selected to be greater than 10 times the starter/alternator rotor time constant which is defined as the time necessary to reach 63% of the desired flux for operating the starter/alternator as a generator at the desired efficiency level. Again, the pulse width magnitude and frequency will depend upon the particular starter/alternator under consideration as well as the energy storage device characteristics, capacitor size, and vehicle electrical load demands. Although the preferred embodiment of the present invention includes the capacitor 34 as the secondary energy storage device for charging the primary energy storage device 18, it is to be understood that the capacitor 34 could also be replaced other energy storage devices such as a battery or a combination battery and capacitor.

Figure 3:
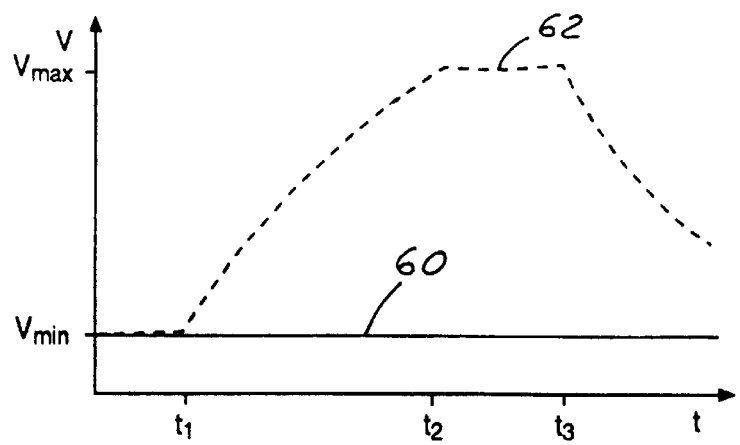
FIG. 3 is a graph of the operation of the power delivery circuit of FIG. 1 when the starter/alternator is operating as a starter motor.

Referring now to FIG. 3, there is shown a graph of the operation of the power delivery circuit of FIG. 1 when the starter/alternator is operating as a starter motor. When the starter/alternator is to be operated as a starter motor to crank the engine, the portions of the converter 14 comprising the up converter, namely, inductor 30, diode 31, and switch 35, are activated to couple the energy storage device 18 to the capacitor 34 to charge the capacitor 34 up to a desired charge value, $V_{max}$. Once the capacitor 34 has reached the desired charge level $V_{max}$, the inverter circuitry 12 is activated to provide the combined energy from capacitor 34 and energy storage device 18 to the starter/alternator 10 which, in turn, generates an output torque to crank the engine 20. In the example shown in FIG. 3, the output of the energy storage device 18 is shown as line 60, and the voltage across the capacitor 34 is shown as line 62. At time $t_1$, the converter 14 is activated to couple the energy storage device 18 and the capacitor 34 to charge the capacitor from $V_{min}$ (or its present voltage level) to the desired voltage level $V_{max}$ which may be greater than the output voltage of the energy storage device 18. The energy storage device 18 has a preferred output of 42 volts, however, can be any desired voltage capacity. At time $t_2$, the capacitor 34 has been charged to the desired voltage level $V_{max}$. At time $t_3$, the inverter circuitry 12 is activated and the energy stored in the capacitor 34 is used to drive the starter/alternator 10 to crank the engine 20. During this time, diode 31 acts to clip the energy delivered to the starter/alternator at the greater of that available from the energy storage device 18 or capacitor 34. By using the capacitor 34 in addition to the energy storage device 18 to provide power to the starter/alternator 10 when acting as a starter motor, more cranking power can be delivered to the engine 20 than would otherwise be available from the energy storage device 18 alone.

When the starter/alternator 10 is operating as a generator, the secondary energy storage device or capacitor 34 is periodically charged by operating the starter/alternator at approximately its peak efficiency output and activating the inverter circuitry such that the capacitor is charged to a desired voltage level. The starter/alternator and/or inverter 12 is then deactivated and the capacitor 34, in turn, is used to maintain a charge across the primary energy storage device 18 to meet the vehicle electrical load demands. In this way, the starter/alternator is only periodically operated and, when operated, it is operating at approximately its peak efficiency, thereby increasing the overall efficiency of the system when in generator mode.

Figure 4:
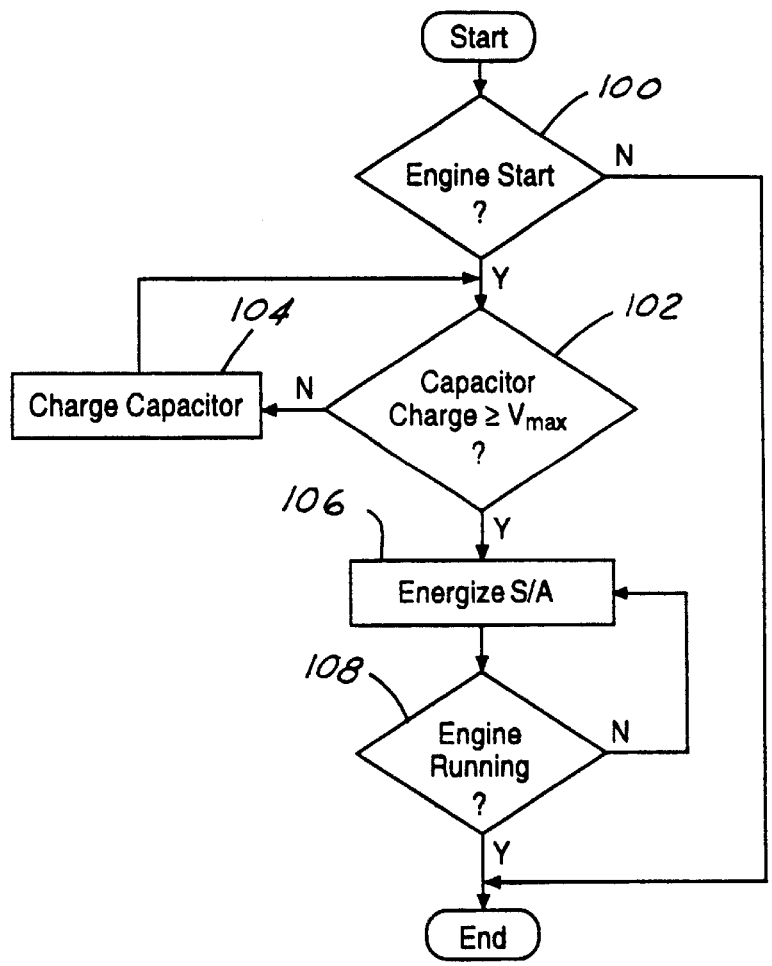
FIG. 4 is a logic flow diagram of one method of operating the power delivery circuit of the present invention.

Referring now to FIG. 4, there is shown a logic flow diagram of one method of operating the power delivery circuit of FIG. 1 when the starter/alternator is to be operated as a starter motor. The logic routine shown in FIG. 4 resides in the controller 16 and is executed each time it is desired to start the engine 20. The logic begins in step 100 by detecting an engine start signal such as from the activation of an ignition key switch indicating the operator's desire to start the engine. If an engine start signal is received, the logic continues to step 102 where the charge across the capacitor 34 is monitored. If the charge across the capacitor 34 is not at the desired level of $V_{max}$, the capacitor is charged in step 104 by activating the inductor 30, diode 31, and switch 35 of the converter circuitry 14 until the capacitor charge has reached a desired voltage $V_{max}$. At this time, the inverter circuitry 12 is activated to energize the starter/alternator in step 106 by delivering the power available from the capacitor 34 and energy storage device 18 to the starter/alternator 10. The starter/alternator 10, operating as a starter motor, engages the flywheel associated with the engine 20 and cranks the engine until it is running. If the engine does not start, the starter/alternator 10 will continue to attempt to crank the engine for a predetermined period of time and/or until the capacitor voltage reaches a minimum value $V_{min}$ to prevent further draining the primary energy storage device 18. Once the engine is running, the starter/alternator can then be operated as a generator as described above to energize the capacitor 34 to maintain the desired charge on the energy storage device 18.

In addition to the steps described above, once the capacitor charge has reached $V_{max}$, an indicator can be activated to alert the vehicle operator that it is appropriate to attempt to start the engine at this point. This is similar to a glow plug indicator light associated with a compression ignition engine. In other words, the vehicle operator would engage the ignition key to a first position, wait until the start engine light was illuminated indicating that the capacitor 34 has been charged to $V_{max}$, and then continue to further engage the ignition key to start the engine by energizing the starter/alternator until the engine was running.

An advantage of the present invention is that the same secondary energy storage device which is used to increase the efficiency of the power circuit when operating in cooperation with the starter/alternator operating as a generator, can be used to increase the power available to the starter/alternator when acting as a starting motor.

From the foregoing, it can be seen that there has been brought to the art a new and improved power delivery circuit for a vehicle having a combined starter/alternator system. While the invention has been described with one or more embodiments, it should be understood that the invention is not limited to those embodiments. On the contrary, the invention covers all alternatives, modifications and equivalents as may be included within the spirit and scope of the appended claims.

What is claimed is:

1. A method of energizing a combined starter/alternator to start an engine in a vehicle including a primary energy storage device and a secondary energy storage device, the method comprising the steps of:

monitoring a charge value on said secondary energy storage device;

activating a converter switching circuit to charge said secondary energy storage device with said primary energy storage device until said charge value is greater than a maximum charge value; and, thereafter activating an inverter switching circuit to energize said starter/alternator with said primary and secondary energy storage devices; and deactivating said inverter switching circuit upon the detection of an engine running signal.

2. A method of energizing a combined starter/alternator to start an engine in a vehicle including a primary energy storage device and a secondary energy storage device, the method comprising the steps of:

monitoring a charge value on said secondary energy storage device;

activating a converter switching circuit to charge said secondary energy storage device with said primary energy storage device until said charge value is greater than a maximum charge value; and, thereafter activating an inverter switching circuit to energize said starter/alternator with said primary and secondary energy storage devices; and deactivating said inverter switching circuit after a predetermined period of time.

3. A method of energizing a combined starter/alternator to start an engine in a vehicle including a primary energy storage device and a secondary energy storage device, the method comprising the steps of:
  monitoring a charge value on said secondary energy storage device;
  activating a converter switching circuit to charge said secondary energy storage device with said primary energy storage device until. said charge value is greater than a maximum charge value; and, thereafter
  activating an inverter switching circuit to energize said starter/alternator with said primary and secondary energy storage devices; and
  detecting a first engine start signal and, in response, activating a converter circuit to charge said secondary energy storage device with said primary energy storage device until said charge value is greater than a maximum charge value.

4. The method of claim 3 further comprising the step of providing a secondary energy storage device charged signal to an operator when said charge value is greater than said maximum charge value.

5. The method of claim 4 further comprising the steps of detecting a second engine start signal and, when said charge value is greater than said maximum charge value, activating said inverter switching circuit to energize said starter/alternator with said primary and secondary energy storage devices.

6. In a vehicle including an engine coupled to a combined starter/alternator and including a primary energy storage device and a secondary energy storage device, a method of starting said engine comprising the steps of:
  detecting a first engine start signal;
  in response, monitoring a charge value on said secondary energy storage device;
  activating a converter switching circuit between said primary and secondary energy storage devices to charge said secondary energy storage device with said primary energy storage device until said charge value is greater than a maximum charge value; and, thereafter
  energizing said starter/alternator with said primary and secondary energy storage devices; and
  coupling said energized starter/alternator to said engine to crank said engine until an engine running signal is detected or said charge value is less than a minimum charge value.

7. The method of claim 6 wherein the step of energizing includes the step of activating an inverter switching circuit to electrically connect said primary and secondary energy storage devices to said starter/alternator.

8. The method of claim 7 further comprising the step of deactivating said inverter switching circuit when said engine running signal is detected or said charge value is less than said minimum charge value.

9. The method of claim 7 further comprising the step of deactivating said inverter switching circuit after a predetermined period of time.

10. The method of claim 6 further comprising the steps of:
  detecting said engine running signal; and
  in response, periodically operating said starter/alternator as a generator at approximately a peak efficiency value; and
  activating an inverter switching circuit for a predetermined period of time to charge said secondary energy storage device with said starter/alternator operating as a generator at approximately said peak efficiency value.

11. A power delivery system for a vehicle including an engine coupled to a combined starter/alternator, the system comprising:
  a primary energy storage device;
  a secondary energy storage device;
  a converter switching circuit for electrically connecting said primary and secondary energy storage devices;
  an inverter switching circuit for electrically connecting said starter/alternator and said primary and secondary energy storage devices; and
  a controller programmed to perform the following steps;
    monitor a charge value on said secondary energy storage device;
    activate said converter switching circuit to charge said secondary energy storage device with said primary energy storage device until said charge value is greater than a maximum charge value; and, thereafter
    activate said inverter switching circuit to energize said starter/alternator with said primary and secondary energy storage devices; and
    deactivate said inverter switching circuit upon the detection of an engine running signal.

12. A power delivery system for a vehicle including an engine coupled to a combined starter/alternator, the system comprising:
  a primary energy storage device;
  a secondary energy storage device;
  a converter switching circuit for electrically connecting said primary and secondary energy storage devices;
  an inverter switching circuit for electrically connecting said starter/alternator and said primary and secondary energy storage devices; and
  a controller programmed to perform the following steps:
    monitor a charge value on said secondary energy storage device;
    activate said converter switching circuit to charge said secondary energy storage device with said primary energy storage device until said charge value is greater than a maximum charge value; and, thereafter
    activate said inverter switching circuit to energize said starter/alternator with said primary and secondary energy storage devices; and
    deactivate said inverter switching circuit after a predetermined period of time.

13. The system of claim 12 wherein said primary energy storage device is a battery and said secondary energy storage device is a capacitor.

14. The system of claim 12 wherein said inverter switching circuit and said converter switching circuit comprise MOSFET switches.

15. The system of claim 12 wherein said inverter switching circuit and said converter switching circuit comprise IGBT switches.

* * * * *